Nov. 13, 1962 A. W. PEIRCE 3,063,106
FOUNDRY MACHINE

Filed May 16, 1960 2 Sheets-Sheet 2

INVENTOR.
ANDREW W. PEIRCE
BY
ATTORNEY

United States Patent Office 3,063,106
Patented Nov. 13, 1962

3,063,106
FOUNDRY MACHINE
Andrew W. Peirce, Benton Harbor, Mich., assignor to Clark Equipment Company, a corporation of Michigan
Filed May 16, 1960, Ser. No. 29,531
3 Claims. (Cl. 22—31)

This invention relates to foundry machines, and more specifically to such a machine for handling a movable mold member or cope.

The movable mold member or cope is often heavy and cumbersome, thus making it difficult to lift the movable mold member off of or place it on the fixed mold member or drag by hand. The principal object of my invention is to provide a machine including power means for handling a movable mold member.

Another object of this invention is to provide means for accurately and speedily raising and lowering a movable mold member or the like at a controlled rate of speed.

Still another object of my invention is to provide means for holding a movable mold member in a raised and tipped position in order to facilitate inspection or cleaning of the movable mold mamber.

In carrying out my invention in one form, I provide a machine having a mechanism carrying the upper mold member and operatively connected to a vertical fluid motor by means of chains and sprockets in such a manner that it moves at a ratio of two to one as the vertical fluid motor moves. Further, the movable mold member is mounted on the carrying mechanism by means of arms in a manner such that as the movable mold member is raised from the fixed mold member by remote control it is tipped after it has been raised clear of the fixed mold member.

Figure 1:
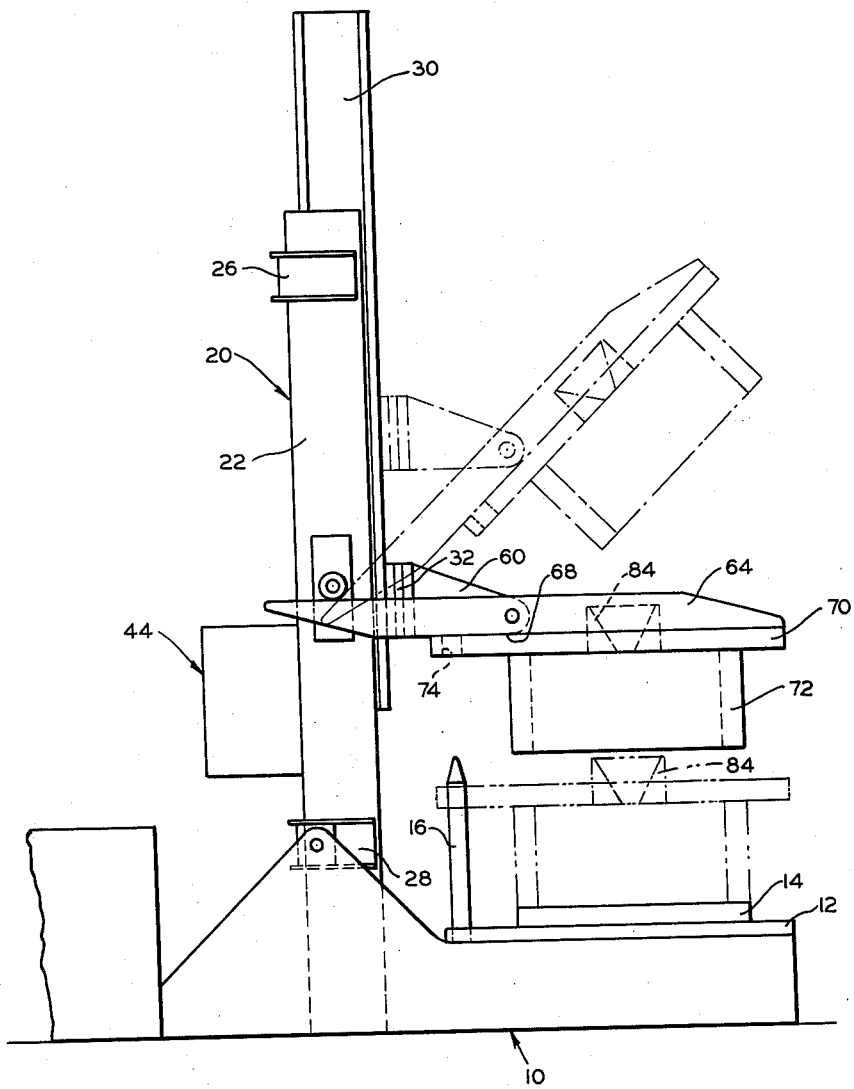
Figure 2:
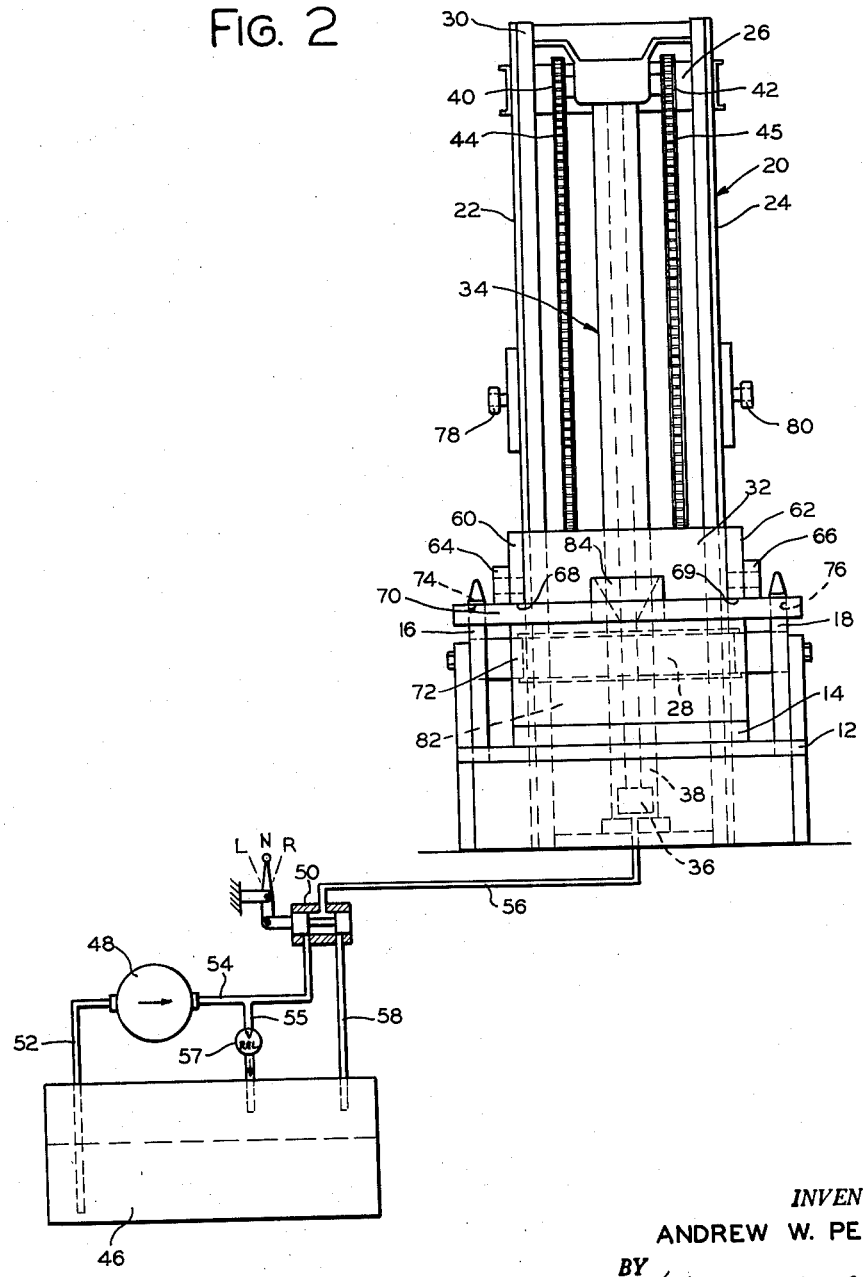

Other objects, advantages and features of the present invention will be apparent from the following detailed description taken in conjunction with the drawings wherein:

FIGURE 1 is a side elevation of a preferred embodiment of my invention showing various positions of the movable mold member, and FIGURE 2 shows a front elevation of the machine of FIG. 1 with the movable mold member in its closed position and including a schematic representation of the fluid system.

Referring to FIGS. 1 and 2, the numeral 10 denotes a base which supports a lower base plate 12 to which a fixed mold member or drag 14 is attached. A pair of guide pins 16 and 18 are attached to and extend vertically upwardly from the lower base plate 12. The base 10 also supports an upright lift assembly 20 comprising a pair of fixed mast members 22 and 24, a cross-brace 26 connecting said fixed mast members 22 and 24 at a point near their top, another cross-brace 28 connecting said fixed mast members 22 and 24 at a point near their bottom, a movable mast member or innerslide 30 which slides vertically between said fixed mast members 22 and 24, a carriage 32, a vertical fluid motor 34 having a piston 36 and a cylinder 38, and mounted intermediate said fixed mast members 22 and 24, a pair of sprockets 40, 42 rotatably mounted on said fluid motor 34, a pair of sprocket chains 44 and 45 attached at one end to cross-brace 28, passing over said sprockets 40, 42 and attached at their other end to said carriage 32. The upright lifting assembly 20 is powered by suitable means shown generally at 44 in FIG. 1 and schematically represented in FIG. 2 as comprising a sump or reservoir 46, a pump 48, a three-position valve 50 shown in its neutral or hold position, a conduit 52 connecting the sump 46 and the pump 48, a conduit 54 connecting the pump 48 and the three-position valve 50 a conduit 55 connecting the conduit 54 and the sump 46 and containing a relief or pressure regulating valve 57, a conduit 56 connecting the three-position valve 50 and the vertical fluid motor 34 and a conduit 58 connecting the three-position valve 50 and the sump 46.

The carriage 32 has a pair of brackets 60 and 62 attached to it which extend outwardly from it at right angles. Pivotally mounted on said brackets 60 and 62 is an upper support member comprising a pair of arms 64 and 66 and a plate 70, the said upper support member normally being held in a horizontally extending position by the plate 70 engaging the bottom edges 68 and 69 of said brackets 60 and 62. The plate 70 carries a movable mold member or cope 72. The plate 70 also has a pair of guide holes 74 and 76 which receive the corresponding guide pins 16 and 18 respectively, thus aligning the movable mold member 72 and the fixed mold member 14 when they are in their closed position. A pair of tipping bosses or rollers 78 and 80 are attached to the fixed mast members 22 and 24 intermediate their ends and serve to tip the movable mold member 72 as the arms 64 and 66 come into contact with the tipping bosses 78 and 80 and the carriage 32 continues to move upwards.

The movable mold member 72 coacts with the fixed mold member 14 to provide a mold cavity 82 when the movable mold member 72 is in its lowered position as shown in FIG. 2 and by the dash double dot lines in FIG. 1. When the movable mold member 72 is in its lowered position, molten metal, such as aluminum, can be poured into the mold cavity 82 through the sprue 84 thereby forming a casting corresponding to the configuration of the mold cavity 82.

I will now describe the operation of my invention. Assuming the movable mold member 72 is in its closed position and also the three-position valve 50 is in its neutral or hold position as shown in FIG. 2, actuation of the three-position valve 50 to the left so that conduits 54 and 56 are connected causes fluid to flow into the upright lift assembly 20 and consequently move the piston 36 upwards. Upward movement of the piston 36 causes the carriage 32 to move upward at twice the rate of speed that the piston 36 is moving due to the sprocket and chain arrangement. As the carriage 32 rises, the movable mold member 72 is caused to rise vertically upwards while being maintained in a horizontal position. At a predetermined point, the arms 64 and 66 come into contact with the tipping bosses 78 and 80 respectively. Further upward movement of the carriage 32 from this point causes the movable mold member 72 to tip upwardly as shown by the dash dot lines in FIG. 1. In order to lower the movable mold member 72 from either its raised or tipped position, the three-position valve 50 is actuated to the right so that conduits 56 and 58 are connected, thus permitting fluid to drain from the upright lift assembly 20 into the sump 46. The movable mold member 72 can be held in any intermediate position merely by placing the three-position valve 50 in its neutral or hold position as shown in FIG. 2 so conduit 56 is not connected with either conduit 54 or 58.

While I have disclosed a preferred embodiment of my invention, I do not intend to limit my invention, except in keeping with the scope and spirit of the following appended claims.

I claim:

1. A machine comprising a base, an upright lift assembly supported by said base and comprising a pair of fixed mast members, a cross-brace holding the tops of said fixed mast members in spaced apart relationship, a cross-brace holding the bottoms of said fixed mast members in spaced apart relationship, a movable mast member which slides up and down between said fixed mast members, a vertical fluid motor mounted intermediate said fixed mast members, a carriage which slides up and down between said fixed mast members, a pair of sprockets rotatably mounted on said vertical fluid motor, a pair of sprocket chains attached at one end to said carriage passing over said sprockets and attached at the other end to said second-mentioned cross-brace thus causing the carriage to move at a ratio of 2 to 1 as the vertical fluid motor moves, pivotable support means mounted on said carriage and adapted to move rectilinearly through a predetermined range, a movable mold member carried by the said pivotable support means, a lower base plate supported by said base and adaptable to hold a fixed mold member, the movable mold member being adapted to coact with the fixed mold member to provide a mold cavity when the movable mold member is in its lowered position, and tipping means attached to said fixed mast members and adapted for automatically tipping the said pivotable support means and the movable mold member when they are raised above the said predetermined range.

2. A machine for foundry use comprising, a base, an upright lift assembly supported by said base, said upright lift assembly including a carriage and power operating means therefor, at least one bracket attached to said carriage and extending horizontally outwardly from it, at least one arm pivotally mounted on said bracket, means cooperating with said arm for holding said bracket normally in a horizontally disposed position, an upper base plate attached to said arm and adaptable to carry a movable mold member rectilinearly through a predetermined range, means attached to said upright lift assembly for tipping the said arm and the movable mold member carried thereby upwardly when they are raised above a predetermined position, and a lower base plate supported by said base and adaptable to hold a fixed mold member.

3. In combination, a base, an upright lift assembly mounted on said base, said upright lift assembly comprising a pair of fixed mast members in spaced apart relationship, a first cross-brace between the tops of said fixed mast members, a second cross-brace between the bottoms of said fixed mast member, an innerslide arranged for vertical reciprocal movement and positioned between said fixed mast members, a vertical fluid motor intermediate said fixed mast members, said fluid motor including a cylinder and a piston slidably mounted within said cylinder, power means for actuating said vertical fluid motor comprising a sump, a pump, a three-position valve, a relief valve, first conduit means communicating said sump with said pump, second conduit means communicating said pump with said three-position valve, third conduit means communicating said three-position valve with said vertical fluid motor, fourth conduit means communicating said vertical fluid motor with said sump, and fifth conduit means communicating said second conduit means with said relief valve, a carriage which slides up and down between said fixed mast members, a pair of sprockets rotatably mounted on said piston, a pair of sprocket chains attached at one end to said carriage passing over said sprockets and attached at the other end to said second cross-brace thus causing the carriage to move at a ratio of 2 to 1 as the piston moves, a pair of brackets mounted on said carriage and extending outwardly therefrom at right angles, a pair of arms pivotally mounted on said brackets and held normally in a horizontally extending position by said brackets, an upper base plate attached to said arms, a movable mold member carried by said upper base plate and adaptable to move rectilinearly through a predetermined range, a pair of bosses extending from said fixed mast members and arranged so they cause the movable mold members to tip as it passes a predetermined point following its initial rectilinear upward movement, a lower base plate mounted on said base, a fixed mold member attached to said lower base plate, a pair of guide pins mounted on said lower base plate, a pair of guide holes in said upper base plate which cooperate with said corresponding guide pins to align said movable and fixed mold members when they are in their closed position, the movable and fixed mold members coacting in their closed position to form a mold cavity, and a sprue through which molten metal can be poured to form a casting in said mold cavity.

References Cited in the file of this patent

UNITED STATES PATENTS

| | | |
|---|---|---|
| 2,316,279 | Osbrink | Apr. 13, 1943 |
| 2,577,091 | Porter | Dec. 4, 1951 |
| 2,728,963 | Rynerson et al. | Jan. 3, 1956 |